(12) United States Patent
Yamaguchi

(10) Patent No.: US 11,520,328 B2
(45) Date of Patent: Dec. 6, 2022

(54) MOBILE TERMINAL AND REMOTE OPERATION METHOD

(71) Applicant: DENSO CORPORATION, Kariya (JP)

(72) Inventor: Taichi Yamaguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 346 days.

(21) Appl. No.: 16/806,025

(22) Filed: Mar. 2, 2020

(65) Prior Publication Data

US 2020/0201320 A1    Jun. 25, 2020

Related U.S. Application Data

(63) Continuation of application No. PCT/JP2018/012626, filed on Mar. 28, 2018.

(30) Foreign Application Priority Data

Sep. 20, 2017 (JP) .............................. JP2017-179716

(51) Int. Cl.
| | |
|---|---|
| *G05D 1/00* | (2006.01) |
| *G06T 7/536* | (2017.01) |
| *G06T 7/571* | (2017.01) |
| *G05D 1/02* | (2020.01) |
| *G06T 7/60* | (2017.01) |
| *H04N 5/225* | (2006.01) |
| *H04N 5/232* | (2006.01) |
| *G06V 20/56* | (2022.01) |

(52) U.S. Cl.
CPC ......... *G05D 1/0038* (2013.01); *G05D 1/0016* (2013.01); *G05D 1/0212* (2013.01); *G06T 7/536* (2017.01); *G06T 7/571* (2017.01); *G06T 7/60* (2013.01); *G06V 20/56* (2022.01); *H04N 5/2253* (2013.01); *H04N 5/23212* (2013.01); *G06T 2207/10148* (2013.01); *G06T 2207/30252* (2013.01); *G06V 2201/08* (2022.01)

(58) Field of Classification Search
CPC .... G05D 1/0038; G05D 1/016; G05D 1/0212; G06T 7/536; G06T 7/571; G06T 7/60; G06V 20/56; H04N 5/2253; H04N 5/23212
USPC ............................................................ 701/2
See application file for complete search history.

(56) References Cited

U.S. PATENT DOCUMENTS 10,821,972 B2 * 11/2020 Krekel ................. B60W 40/08
11,091,156 B2 *  8/2021 Haque .................. B60W 30/09
(Continued)

FOREIGN PATENT DOCUMENTS

| | | |
|---|---|---|
| DE | 102012016868 A1 | 2/2014 |
| DE | 102015223471 A1 | 6/2017 |

(Continued)

*Primary Examiner* — Yazan A Soofi
(74) *Attorney, Agent, or Firm* — Harness, Dickey & Pierce, P.L.C.

(57) ABSTRACT

A mobile terminal to be carried by a user of a vehicle acquires a captured image of the vehicle, acquires distance information on a distance to the vehicle based on the captured image, determines whether the distance to the vehicle is within a predetermined allowable distance based on the distance information, and transmits an operation signal corresponding to an operation content input by a user to the vehicle when the distance to the vehicle is determined to be within the allowable distance.

12 Claims, 9 Drawing Sheets

(56) References Cited

U.S. PATENT DOCUMENTS

| | | | |
|---|---|---|---|
| 2014/0058613 A1* | 2/2014 | Leinfelder | B60W 30/00 |
| | | | 701/28 |
| 2014/0184914 A1* | 7/2014 | Oshima | H04N 21/41407 |
| | | | 348/564 |
| 2016/0148450 A1* | 5/2016 | Ohshima | B62D 15/0285 |
| | | | 340/5.61 |
| 2018/0144566 A1 | 5/2018 | Ohshima | |
| 2018/0273029 A1* | 9/2018 | Marcial-Simon | B60W 10/04 |
| 2020/0142400 A1* | 5/2020 | Kuwabara | B60W 30/06 |
| 2020/0238978 A1* | 7/2020 | Suzuki | B60W 30/06 |
| 2021/0089019 A1* | 3/2021 | Shimamoto | G01S 3/023 |
| 2021/0157335 A1* | 5/2021 | Shimamoto | G06T 7/70 |
| 2022/0108262 A1* | 4/2022 | Cella | G06Q 10/063118 |

FOREIGN PATENT DOCUMENTS

| | | | |
|---|---|---|---|
| JP | 2014065392 A | 4/2014 | |
| JP | 2015089733 A | 5/2015 | |
| JP | 2016097927 A | 5/2016 | |
| JP | 2016151913 A | 8/2016 | |
| WO | WO-2014103158 A1 | 7/2014 | |
| WO | WO-2015068032 A1 | 5/2015 | |

* cited by examiner

MOBILE TERMINAL AND REMOTE OPERATION METHOD

CROSS REFERENCE TO RELATED APPLICATIONS

The present application is a continuation application of International Patent Application No. PCT/JP2018/012626 filed on Mar. 28, 2018, which designated the U.S. and claims the benefit of priority from Japanese Patent Application No. 2017-179716 filed on Sep. 20, 2017. The entire disclosures of all of the above applications are incorporated herein by reference.

TECHNICAL FIELD

The present disclosure relates to a mobile terminal and a remote operation method.

BACKGROUND

There has been proposed a technique to leave or enter a vehicle from or into a parking spot by controlling the vehicle from outside the vehicle with the use of a remote control device. In addition, since mobile terminals such as smartphones have become widespread today, there has also been proposed a technique of enabling the vehicle to be steered from the outside by operating a forward/reverse button or a steering button displayed on a touch panel of a mobile terminal.

SUMMARY

A mobile terminal according to one aspect of the present disclosure is to be carried by a user of a vehicle, acquires a captured image of the vehicle, acquires distance information on a distance to the vehicle based on the captured image, determines whether the distance to the vehicle is within a predetermined allowable distance based on the distance information, and transmits an operation signal corresponding to an operation content input by the user to the vehicle when the distance to the vehicle is determined to be within the allowable distance.

A remote operation method according to another aspect of the present disclosure is for moving a vehicle by a remote the operation using a mobile terminal carried by a user of the vehicle and includes acquiring a captured image of the vehicle, acquiring distance information on a distance to the vehicle based on the captured image, determining whether a distance to the vehicle is within a predetermined allowable distance based on the distance information, and transmitting an operation signal corresponding to operation by the user to the vehicle when the distance to the vehicle is determined to be within the allowable distance.

BRIEF DESCRIPTION OF DRAWINGS

Objects, features and advantages of the present disclosure will become apparent from the following detailed description made with reference to the accompanying drawings. In the drawings.

DETAILED DESCRIPTION

Figure 1:
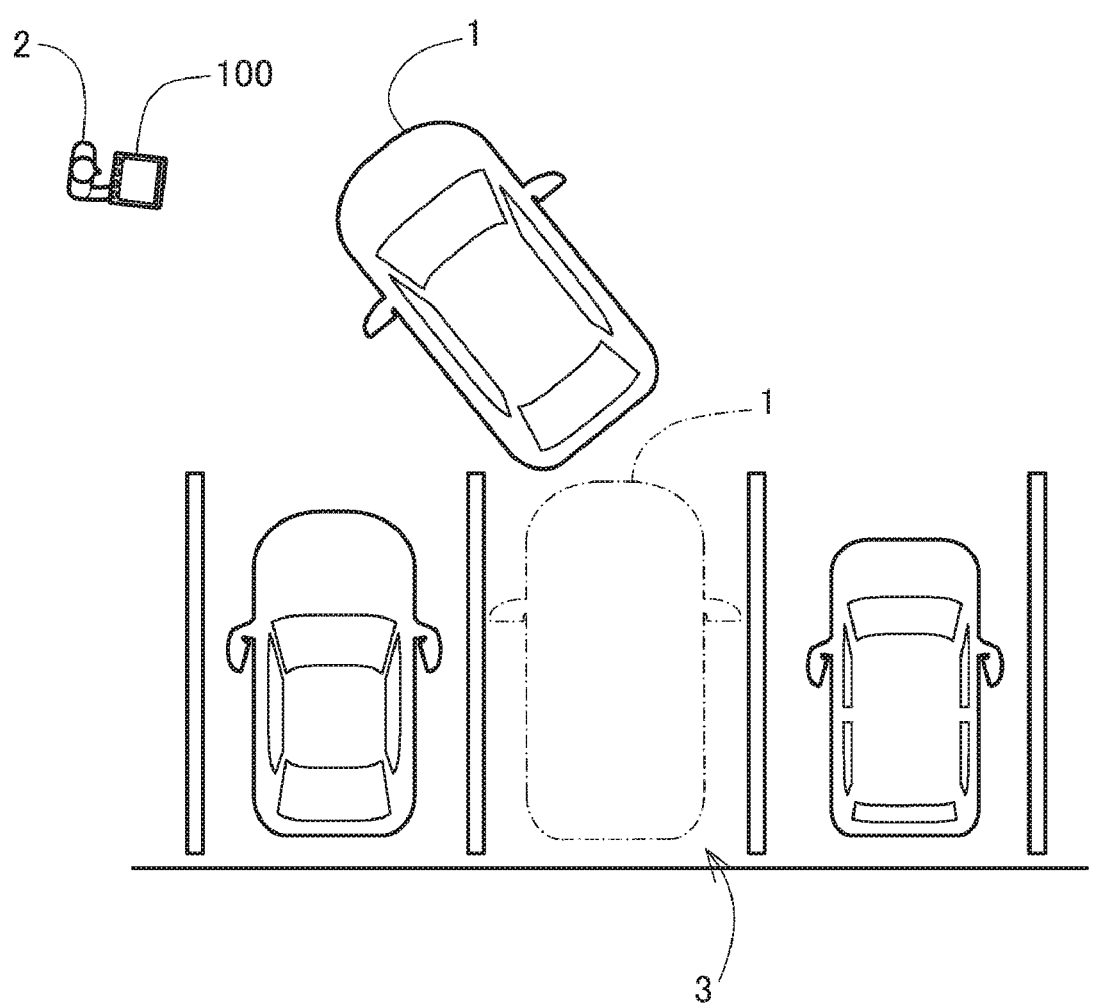
FIG. 1 is a diagram illustrating a situation in which a vehicle is moved by a remote operation with a mobile terminal according to the present embodiment.

When a vehicle is remotely operated from the outside of the vehicle, it is considered that a user of the vehicle is obliged to safely operate the vehicle in the same manner as in the case of the normal driving operation. Therefore, it is necessary for the user of the vehicle to sufficiently grasp a situation of the vehicle and a situation around the vehicle, and for that purpose (even in remote operation), it is desirable to operate the vehicle in a state in which the user is in the vicinity of the vehicle.

According to one technique, the presence of the user in the vicinity of the vehicle is confirmed by detecting an electronic key carried by the user of the vehicle. In this technique, the vehicle searches for the electronic key present in the vicinity and, when the electronic key is found, the vehicle authenticates whether the electronic key is a proper electronic key. As a result, when the electronic key is the proper electronic key, it is determined that the user of the vehicle is present in the vicinity, and the vehicle accepts a remote operation from the outside.

However, in the above-described technique, since the authentication is performed with the use of the electronic key, the user of the vehicle needs to carry the electronic key in addition to a mobile terminal even when the vehicle is remotely operated with the use of the mobile terminal.

It is needless to say that such an issue does not occur if the user of the vehicle can confirm the presence of the mobile terminal in the vicinity by detecting the mobile terminal instead of the electronic key, but in reality, since a radio wave intensity of the mobile terminal largely fluctuates when reaching the vehicle due to the influence of a human body, it is difficult to correctly determine whether the mobile terminal is present in the vicinity of the vehicle.

As a result, when attempting to remotely operate the vehicle, the user of the vehicle needs to carry the electronic key in addition to the mobile terminal for remote operation.

A mobile terminal according to one aspect of the present disclosure is to be carried by a user of a vehicle and is capable of moving the vehicle by remote operation by transmitting an operation signal corresponding to operation by the user to the vehicle. The mobile terminal includes an image acquisition section, an image display section, a distance information acquisition section, a determination section, an operation content detection section, an operation signal transmission section. The image acquisition section is connected to an imaging section that captures an image of the vehicle and acquires a captured image from the imaging section. The image display section displays the captured image. The distance information acquisition section detects the vehicle in the captured image and acquires distance information on a distance to the vehicle based on the captured image. The determination section determines whether the distance to the vehicle is within an allowable distance, which is predetermined, based on the distance information. The operation content detection section is connected to an operation section provided to be operable by the user while checking a display of the captured image, and detects an operation content to the operation section. The operation signal transmission section transmits the operation signal corresponding to the operation content to the vehicle when the distance to the vehicle is determined to be within the allowable distance. Even after the operation signal transmission section has transmitted the operation signal to the vehicle, when the vehicle is no longer detected in the captured image or when the distance to the vehicle is determined to be outside the allowable distance, the operation signal transmission section stops transmitting the operation signal corresponding to the operation content until the distance to the vehicle is determined to be within the allowable distance.

A remote operation method according to another aspect of the present disclosure is for moving a vehicle by a remote operation using a mobile terminal carried by a user of the vehicle, and includes acquiring a captured image of the vehicle from an imaging section mounted on the mobile terminal and displaying the captured image, detecting the vehicle in the captured image and acquiring distance information on a distance to the vehicle, determining whether a distance to the vehicle is within a predetermined allowable distance based on the distance information, detecting an operation content input to an operation section provided to be operable by the user while checking a display of the captured image, and transmitting an operation signal corresponding to the operation content to the vehicle when the distance to the vehicle is determined to be within the allowable distance. Even after having transmitted the operation signal to the vehicle, when the vehicle is no longer detected in the captured image or when the distance to the vehicle is determined to be outside the allowable distance, the transmission of the operation signal corresponding to the operation content is stopped until the distance to the vehicle is determined to be within the allowable distance.

A mobile terminal according to another aspect of the present disclosure is to be carried by a user of a vehicle, and includes a camera configured to capture an image of the vehicle, a display panel, an antenna, an operation button provided to be operable by the user to remotely control the vehicle, a processor connected to the camera, the display panel, the antenna, and the operation button, and a memory storing a program. The program instructs the processor to acquire a captured image from the camera and to display the captured image on the display panel, to detect the vehicle in the captured image and to acquire distance information on a distance to the vehicle based on the captured image, to determine whether the distance to the vehicle is within an allowable distance, which is predetermined, based on the distance information, to detect an operation content input by the user with the operation button, and to transmit the operation signal corresponding to the operation content from the antenna to the vehicle when the distance to the vehicle is determined to be within the allowable distance. Even after having transmitted the operation signal to the vehicle, when the vehicle is no longer detected in the captured image or when the distance to the vehicle is determined to be outside the allowable distance, the program instructs the processor to stop transmitting the operation signal corresponding to the operation content until the distance to the vehicle is determined to be within the allowable distance.

When the distance from the mobile terminal to the vehicle is farther than the allowable distance, the operation signal is not transmitted from the mobile terminal to the vehicle, so that the fact that the vehicle receives the operation signal from the mobile terminal is nothing other than that the mobile terminal is present within the allowable distance from the vehicle. In addition, since the allowable distance from the mobile terminal to the vehicle is acquired based on the captured image, the allowable distance is less likely to be affected by disturbance or the like as compared with the case in which the allowable distance is acquired based on the radio wave intensity or the like, and for that reason, it can be determined whether the mobile terminal is within the allowable distance from the vehicle with high reliability. As a result, even if the user of the vehicle does not carry the electronic key, if the user carries a mobile terminal for remotely operating the vehicle, a situation in which the vehicle is remotely operated from a distance farther than the allowable distance can be avoided.

Hereinafter, embodiments for clarifying contents of the present disclosure will be described.

FIG. 1 shows a state in which a vehicle 1 is moving toward a parking spot 3 among multiple partitioned parking spots in order to park the vehicle 1, as viewed from above. A user 2 of the vehicle 1 is out of the vehicle around the vehicle 1, and remotely operates the vehicle 1 with a mobile terminal 100. The vehicle 1 is moved to a position indicated by a virtual line 1 and parked in the parking spot 3 by being moved backward while turning to the left by a remote operation by the user 2. In this way, although the vehicle 1 can be remotely operated with the use of the mobile terminal 100, the situation around the vehicle 1 cannot be sufficiently confirmed when the user 2 of the vehicle 1 remotely operates away from the vehicle 1. Therefore, in the mobile terminal 100 of the present embodiment, when the mobile terminal 100 is in the vicinity of the vehicle 1, the mobile terminal 100 can operate the vehicle 1, but cannot operate the vehicle 1 when the mobile terminal 100 is far from the vehicle 1.

Figure 2:
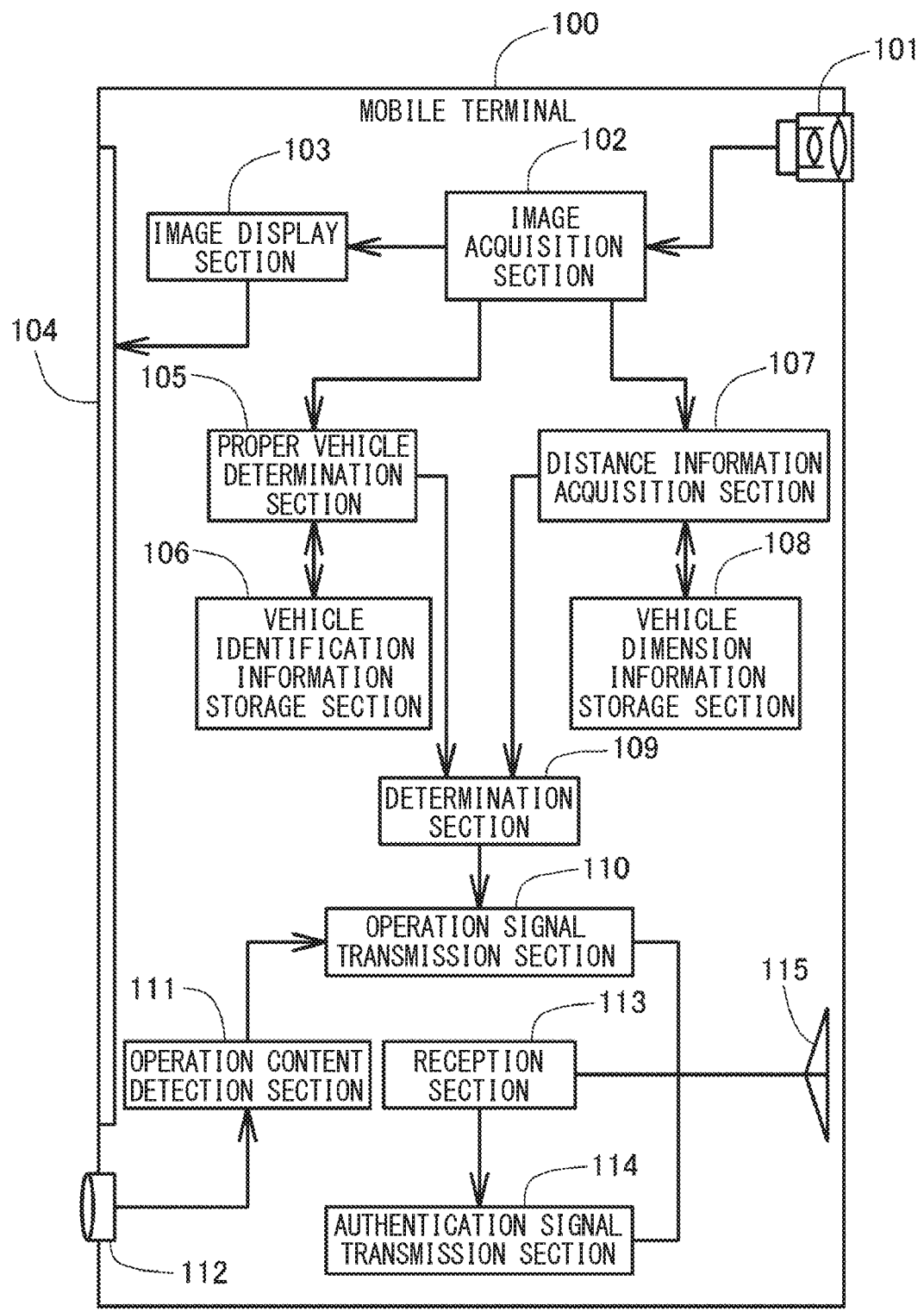
FIG. 2 is a diagram illustrating a rough internal structure of the mobile terminal.

FIG. 2 shows a rough internal structure of the mobile terminal 100 according to the present embodiment. As illustrated, the mobile terminal 100 includes an imaging section 101, an image acquisition section 102, an image display section 103, a display device 104, a proper vehicle determination section 105, a vehicle identification information storage section 106, a distance information acquisition section 107, a vehicle dimension information storage section 108, a determination section 109, an operation signal transmission section 110, an operation content detection section 111, an operation section 112, a reception section 113, an authentication signal transmission section 114, and an antenna 115.

Note that each "section" of the mobile terminal 100 is merely a classification of the inside of the mobile terminal 100 for convenience, focusing on a function required when the vehicle 1 is remotely operated, and does not indicate that the mobile terminal 100 is physically divided. Therefore, each "section" can be realized as a computer program executed by a CPU, or can be realized as an electronic circuit including an LSI, or can be realized as a combination of the computer program with the electronic circuit.

The imaging section 101 includes, for example, a CCD camera or a CMOS camera provided on a rear surface of the mobile terminal 100, and performs image capturing continuously during the remote operation of the vehicle 1. The image section may also be referred to as a camera. The image acquisition section 102 is connected to the imaging section 101, and acquires an image captured by the imaging section 101 in a predetermined cycle. Then, the acquired captured images are sequentially output to the image display section 103, and are output to the proper vehicle determination section 105 and the distance information acquisition section 107 whenever necessary, for example, when there is a data request from those sections.

The image display section 103 sequentially outputs the captured images received from the image acquisition section 102 to the display device 104 provided on, for example, a front surface of the mobile terminal 100. As a result, the latest captured image is always displayed on the display device 104. The display device 104 is provided with a thin panel such as an LCD or an organic EL, and is provided in a wide range over almost the entire front surface. The display device 104 is a touch panel of an appropriate type such as a pressure sensitive type or an electrostatic type, and various inputs and operation instructions can be given by touching displayed icons. The display device 104 may also be referred to as a display panel. During the remote operation, the user 2 of the vehicle 1 performs an operation while checking the vehicle 1 displayed on the display device 104, and adjusts an orientation of the mobile terminal 100 as needed so that the vehicle 1 can be captured by the imaging section 101.

The proper vehicle determination section 105 analyzes the captured image received from the image acquisition section 102, extracts a vehicle image from the captured image, extracts vehicle identification information from the vehicle image, and compares the extracted vehicle identification information with identification information of the vehicle 1 stored in advance in the vehicle identification information storage section 106, thereby determining whether the vehicle captured by the mobile terminal 100 is the vehicle 1 to be remotely operated by the mobile terminal 100, that is, a proper vehicle. The vehicle determination result is output to the determination section 109. In this example, the vehicle identification information includes, for example, a license plate identifier of the vehicle 1, a shape of the vehicle, a color, and the like. In principle, it is determined that the vehicle is a proper vehicle by matching the license plate identifier, but instead of the license plate identifier, for example, the determination may be performed by the shape and color of the vehicle. Depending on a positional relationship between the user 2 of the vehicle 1 and the vehicle 1, it is effective to determine whether the vehicle is a proper vehicle based on the shape and color of the vehicle in the case where the license plate does not appear in the captured image or in the case where an identifier cannot be clearly read even if the license plate appears in the captured image. In order to more reliably determine whether the vehicle is a proper vehicle, the matching of the shape and color of the vehicle may also be a condition in addition to the license plate identifier. The vehicle identification information storage section 106 stores, for example, information input by the user 2 of the vehicle 1 operating the mobile terminal 100 or transmitted from another device to the mobile terminal 100 prior to the remote operation.

The distance information acquisition section 107 analyzes the captured image received from the image acquisition section 102 while referring to the dimension information on a full length, a lateral width, and the like of the vehicle 1 stored in advance in the vehicle dimension information storage section 108, and acquires distance information on a distance from the mobile terminal 100 to the vehicle 1. The acquired distance information is output to the determination section 109. Since a size of the vehicle in the image depends on an image capturing distance, the distance to the vehicle 1 can be obtained by comparing the vehicle dimension in the image with a vehicle dimension stored in advance. The distance information is not limited to the distance obtained in this manner, and may be information relating to a magnitude relationship with a predetermined reference value. For example, the reference value of the vehicle dimension is set in advance, and the vehicle dimension acquired from the image is compared with the reference value, and stored as a large value when the vehicle dimension is equal to or larger than the reference value, or as a small value when the vehicle dimension is smaller than the reference value. In other words, the distance information can be acquired based on the size of the vehicle 1 in the captured image. The reference value of the vehicle dimension is determined to be, for example, the vehicle dimension in the image when the distance from the mobile terminal 100 to the vehicle 1 is an allowable distance that can be determined to be safe even if a remote operation is performed.

The vehicle dimension information storage section 108 stores, for example, dimension information relating to the vehicle 1 input by the user 2 of the vehicle 1 operating the mobile terminal 100 or transmitted from another device to the mobile terminal 100 prior to remote operation. The allowable distance is a distance that can be determined to be safe even if the remote operation is performed, and is set to, for example, about several meters to several tens of meters.

As the reference value of the vehicle dimension, for example, a general-purpose dimension of about 5 m may be set in place of the actual dimension of the vehicle 1 to be operated, and the input of the vehicle dimension may be omitted. When such a general-purpose dimension is used as a reference, when detecting the distance between the mobile terminal 100 and the vehicle 1, an error corresponding to the difference in the actual vehicle dimension may occur, and therefore, the allowable distance may be set in consideration of the error.

The determination section 109 determines whether to transmit a remote operation signal to the vehicle 1 based on the vehicle determination result as to whether the vehicle is a proper vehicle received from the proper vehicle determination section 105 and the distance information received from the distance information acquisition section 107. When the vehicle determination result is the determination of a proper vehicle, it is determined whether the distance from the mobile terminal 100 to the vehicle 1 falls within the allowable distance based on the distance information, and when the distance falls within the allowable distance, a transmission permission signal is output to the operation signal transmission section 110. In the case where the distance information is a distance derived from the vehicle dimensions in the image, the determination is affirmative when the distance is less than or equal to the allowable distance, and in the case where distance information is a magnitude relationship of the vehicle dimensions, the determination is affirmative when the magnitude relationship is "large", that is, greater than or equal to the reference value. However, if the vehicle determination result is not the proper vehicle, or if it is determined that the distance is not within the allowable distance, the remote operation should not be allowed, and therefore, the transmission permission instruction is not output, or a transmission prohibit instruction is output. In the determination by the determination section 109, on the contrary to the above determination, the determination of whether the distance is within the allowable distance may be performed first, and when it is determined that the distance is within the allowable distance, the determination of whether the vehicle is a proper vehicle may be performed.

The operation content detection section 111 detects an operation content operated to the operation section 112 using operation buttons or the like, generates an operation signal according to the operation content, and outputs the operation signal to the operation signal transmission section 110. In addition to the operation buttons shown in the drawing, the operation section 112 includes the display device 104 or the like serving as a touch panel, and the operation content includes an operation performed using the touch panel. The operation signal transmission section 110 outputs the operation signal received from the operation content detection section 111 if the transmission permission instruction has been received from the determination section 109. The output operation signal is transmitted from the antenna 115 to the vehicle 1. If there is no transmission permission instruction, the operation signal is not transmitted.

The reception section 113 receives a signal transmitted from the vehicle 1 through the antenna 115. Upon receiving the authentication request signal from the vehicle 1, the reception section 113 outputs the authentication request signal to the authentication signal transmission section 114. Upon receiving the authentication request signal, the authentication signal transmission section 114 transmits an authentication signal stored in advance to the vehicle 1. The vehicle 1 transmits the authentication request signal in a predetermined cycle, and searches for the mobile terminal 100 present in the surrounding area. When the user 2 of the vehicle 1 comes close to the vehicle 1 while holding the mobile terminal 100, the mobile terminal 100 receives the authentication request signal when the mobile terminal 100 enters a range in which the radio wave from the vehicle 1 is arrival, whereby the authentication process with the vehicle 1 is automatically performed in a so-called passive method.

Figure 3:
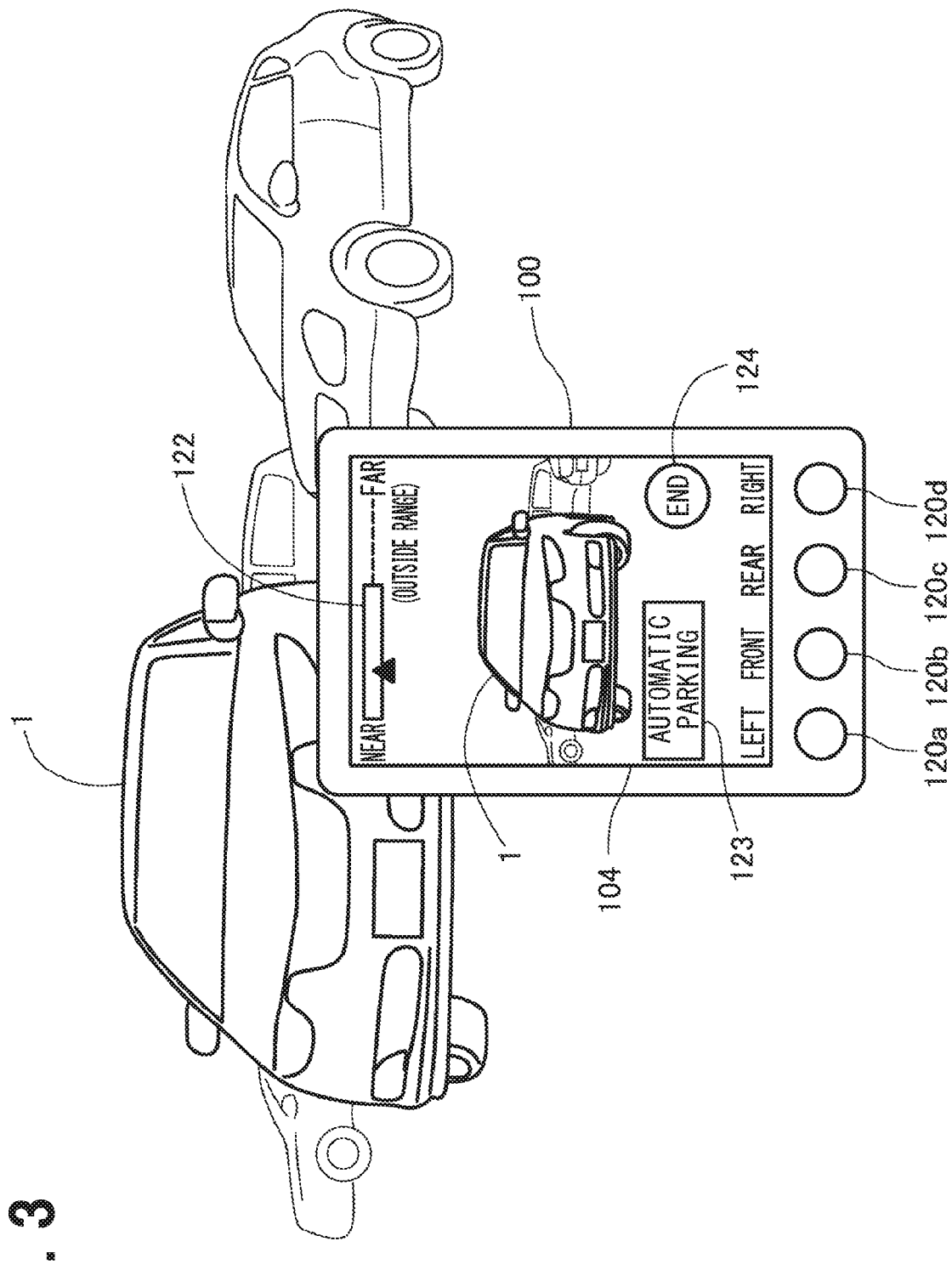
FIG. 3 is a diagram illustrating an example of a screen display of the mobile terminal when the vehicle is remotely operated.

FIG. 3 shows an execution situation of the remote operation of the vehicle 1 using the mobile terminal 100 together with a display example of the display device 104. The vehicle 1 to be operated is located in front of the mobile terminal 100, and the vehicle 1 is operated to be parked between the other two vehicles aligned in the rear. The mobile terminal 100 includes the display device 104 and a plurality of, for example, four, operation buttons 120a, 120b, 120c, and 120d as components of the operation section 112. As described above, the operation section 112 is on the same plane with the display device 104, and can be operated while checking the display of the display device 104. FIG. 3 shows a situation in which a remote operation application is activated and operated by the mobile terminal 100, and an operation screen of the application is displayed on the display device 104. In the operation screen, "left", "front", "rear", and "right" characters are displayed in order from the left at positions above the respective buttons 120. Those characters represent the functions of applications associated with the respective operation buttons 120a to 120d, and the vehicle 1 can be steered leftward by the operation button 120a, the vehicle 1 can be moved forward by the operation button 120b, the vehicle 1 can be moved rearward by the operation button 120c, and the vehicle 1 can be steered rightward by the operation button 120d. Each operation is performed while each operation button 120 is pressed, for example.

A distance display section 122 is disposed on an upper portion of the operation screen. The distance display section 122 includes "near" and "far" characters displayed at the left end and the right end, respectively, a wide allowable distance bar displayed from a position where the "near" character is displayed toward the "far" character to the midway position, a dashed line displayed between the allowable distance bar and "far", and an "outside range" character displayed under the dashed line. A black-painted triangle mark (hereinafter referred to as a black triangle mark) is displayed on the allowable distance bar. The distance display section 122 displays the current distance from the mobile terminal 100 to the vehicle 1 and indicates whether the current distance is within an allowable range. The black triangle mark represents the current distance, and the allowable distance bar represents a distance range in which the remote operation is permitted, and the dashed line represents a range which exceeds the allowable distance. When the black triangle mark is positioned closer to "near", the distance to the vehicle 1 is closer, and on the contrary, when the black triangle mark is positioned closer to "far", the distance to the vehicle 1 is farther. If the black triangle mark is on the allowable distance bar, the user 2 of the vehicle 1 can visually recognize that the distance to the vehicle 1 is within the allowable distance and the remote operation can be performed. If the black triangle mark is on the dashed line, the user 2 can visually recognize that the distance to the vehicle 1 exceeds the allowable distance and the remote operation cannot be performed.

In the lower right portion of the operation screen, an operation end button 124 is displayed. The user 2 of the vehicle 1 taps the operation end button 124 to transmit a remote operation end instruction to the vehicle 1 to end the remote operation.

The vehicle 1 is displayed in the vicinity of the center of the operation screen. The remote operation can be performed when the vehicle 1 is displayed on the operation screen. The user 2 of the vehicle 1 presses and operates the operation buttons 120a to 120d while capturing an image of the vehicle 1 with the mobile terminal 100, thereby transmitting respective operation instructions of forward, backward, left steering, and right steering to the vehicle 1, and moving the vehicle 1 to a target parking position. As described above, since the remote operation is performed while viewing both the operation screen and the actual vehicle 1 when the vehicle 1 is displayed in the operation screen and is present within the allowable distance, the user 2 of the vehicle 1 can safely perform the remote operation while checking the surrounding situation of the vehicle 1. The "front", "rear", "left" and "right" displayed on the operation screen are, for example, the same as the operation direction in the normal operation of the vehicle 1, but, for example, "left" and "right" can be set to be opposite to the normal in accordance with the left and right on the screen.

Incidentally, the operation buttons 120 corresponding to the contradictory operation directions "front", "rear", or "left" and "right" are set mutually exclusively, and even if those buttons 120 are pressed together, the operation signals of both forward and backward, and the operation signals of both left steering and right steering are not transmitted to the vehicle 1. When the two exclusive operation buttons 120 are pressed together, an operation signal corresponding to one button previously pressed can be transmitted to the vehicle 1, and the operation of the later pressed button can be ignored, or the signal transmission can be stopped and a warning indicating that the operation cannot be simultaneously performed can be displayed on the operation screen.

On the other hand, a state in which one of "front" and "rear" and one of "left" and "right" are pressed together is permitted. When pushed together, the vehicle 1 moves forward or backward while changing the direction of the wheels. In other words, while "front" or "rear" and "left" or "right" are pressed, the vehicle 1 moves forward and backward while a turning radius changes. On the other hand, when either of the "left" and the "right" is pushed alone, a so-called "stationary steering" is performed in which the direction of the wheels is changed in a stopped state of the vehicle 1.

An automatic parking button 123 is provided at the lower left of the operation screen of the display device 104. The automatic parking button 123 is displayed and selectable when the vehicle 1 is equipped with a self-driving function. When the user 2 of the vehicle 1 taps the automatic parking button 123, the vehicle 1 captures an image of the surrounding area with the use of an on-board camera (not shown), and recognizes the parking spot 3 by analyzing the captured image. Then, the vehicle is automatically parked in the parking spot 3 by automatically performing a steering operation, a braking operation, and an accelerator operation while recognizing an obstacle present around the vehicle 1 using a sonar or radar (not shown).

Even if the vehicle 1 has the function of automatically parking, the user 2 of the vehicle 1 is also charged with the responsibility of paying attention so that the vehicle 1 can be parked safely. Therefore, even after the automatic parking button 123 is tapped to start automatic parking, the user 2 of the vehicle 1 can confirm an appearance in which the vehicle 1 is automatically parked, and a situation around the vehicle 1 according to the image of the vehicle 1 displayed on the display device 104 of the mobile terminal 100. It is needless to say that the distance to the vehicle 1 can also be easily grasped from the display of the distance display section 122. When any trouble or danger is felt, the vehicle 1 can be stopped and the automatic parking can be released by tapping the operation end button 124. This makes it possible for the user 2 of the vehicle 1 to park the vehicle 1 safely more than in the case of driving while sitting in a driver seat of the vehicle 1.

Alternatively, while the user 2 presses the automatic parking button 123, the vehicle 1 moves toward the inside of the parking spot 3 with the use of the automatic parking function, but when the user 2 releases his finger from the automatic parking button 123, the automatic parking function of the vehicle 1 may be canceled and the vehicle 1 may be stopped on the spot. This makes it possible to secure safety even when the vehicle 1 is automatically parked.

In the mobile terminal 100 of the present embodiment, as illustrated in FIG. 3, the operation buttons 120 are realized by hardware of the mobile terminal 100. However, some or all of the operation buttons 120 may be displayed on the display device 104 of the mobile terminal 100, thereby being realized by software. For example, when a mobile terminal having three or less operation buttons 120 mounted on the mobile terminal is used for a remote operation, it is effective to mount the operation buttons 120 in a software manner.

Figure 4:
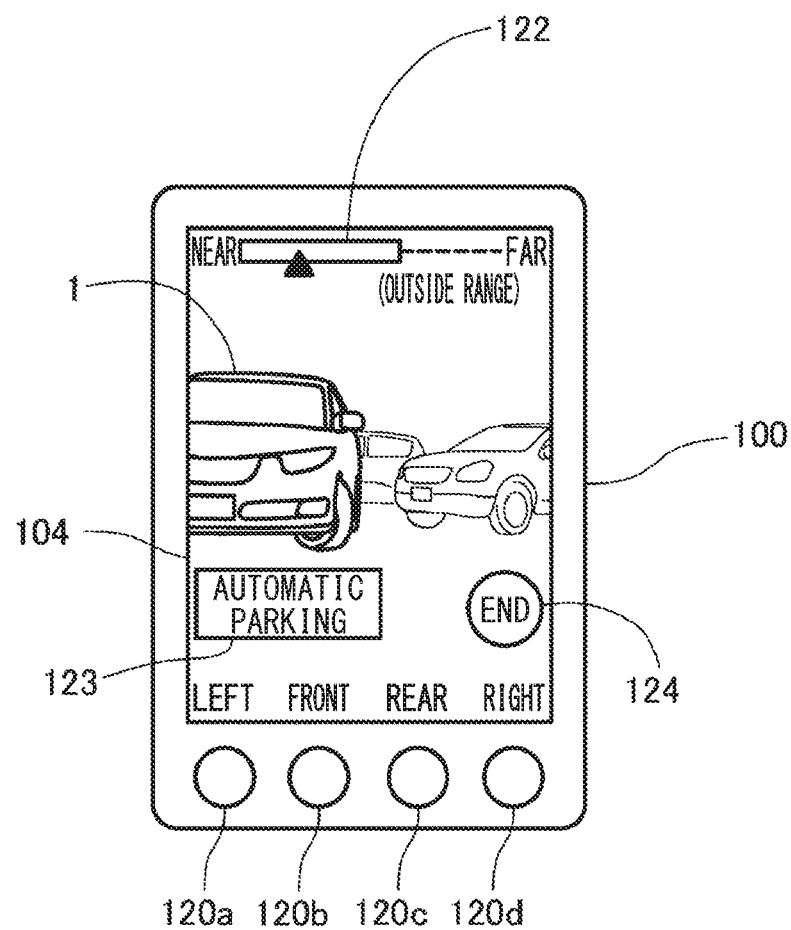
FIG. 4 is a diagram illustrating an example of a situation in which the remote operation is prohibited.

FIG. 4 shows an example of the display on the display device 104 in a situation where remote operation is prohibited. In this display example, the vehicle 1 does not entirely appear in the display screen of the display device 104, and a part of the vehicle 1 protrudes to the left. In the present embodiment, for example, when the entire vehicle 1 appears on the display screen of the display device 104, it is determined that an image of the vehicle 1 to be remotely operated is being captured, and in that case, it is determined whether the vehicle is proper, and whether the distance is within the allowable distance. Since the size of the vehicle in the captured image can be accurately detected by determining whether the vehicle 1 is captured in this manner, the determination of whether the vehicle is a proper vehicle and the determination of whether the vehicle is within the allowable distance are more ensured. Instead of the determination as described above, it can be determined that the vehicle 1 is in an image captured state, for example, if a constant or more proportion of the whole of the vehicle 1 is within the display screen. If the license plate is clearly readable, it can be determined whether the vehicle is a proper vehicle based on the matters described in the license plate even when the entire of the vehicle 1 is not necessarily imaged.

The process of remotely parking the vehicle 1 during engine operation with the use of the mobile terminal 100 will be described. Before the following processing, the vehicle 1 performs an authentication process of the mobile terminal 100. The above authentication process is performed, for example, by the mobile terminal 100 receiving the authentication request signal repeatedly transmitted from the vehicle 1 toward the surroundings at a predetermined time interval by the reception section 113 as described above, and transmitting the authentication signal from the authentication signal transmission section 114 to the vehicle 1.

Figure 5:
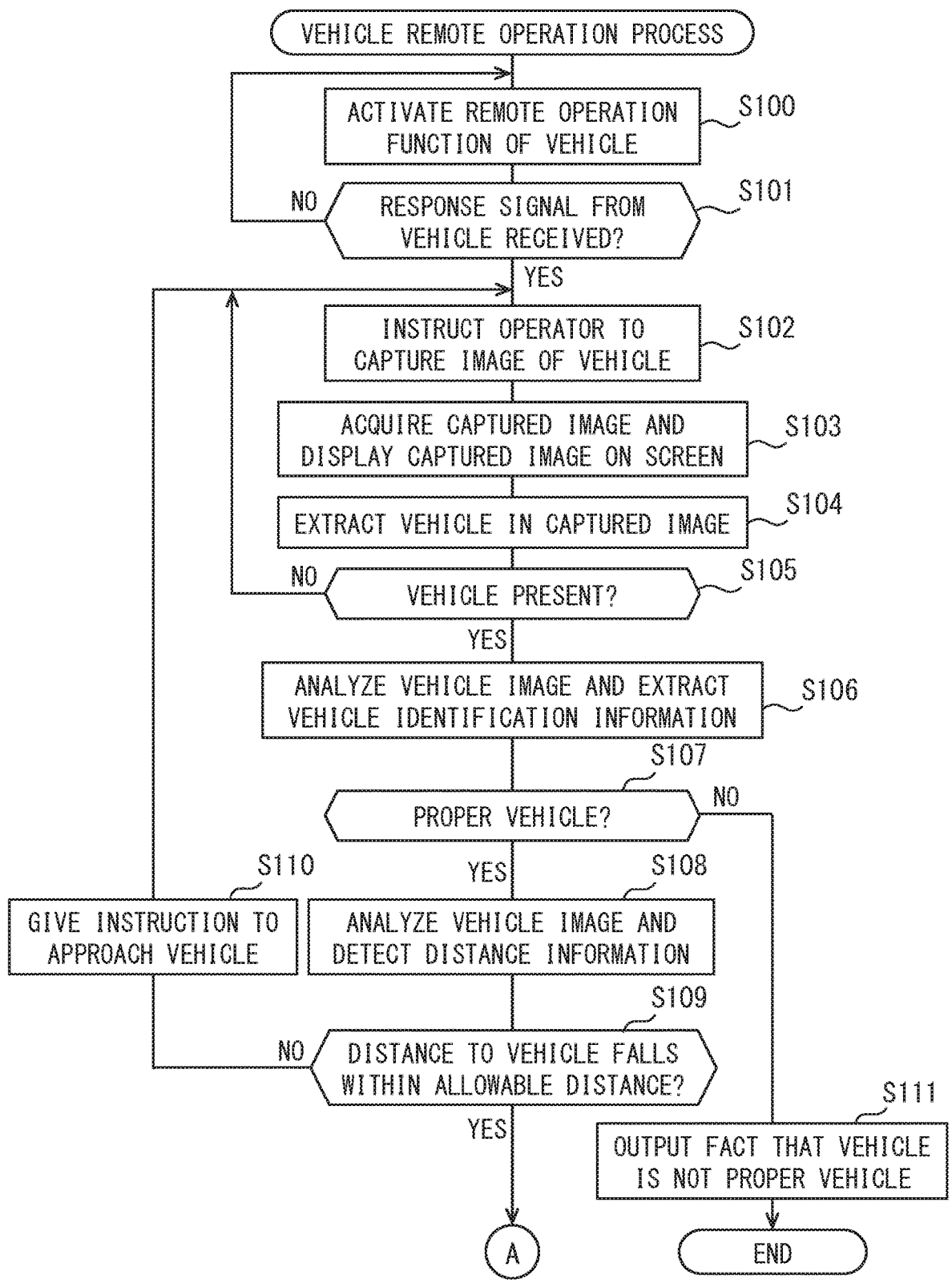
FIG. 5 is a flowchart of a start propriety determination stage of a vehicle remote operation process.

FIG. 5 shows a flowchart of a remote operation propriety determination process in which the mobile terminal 100 analyzes an image of the vehicle 1, detects the vehicle identification information and the distance information, and determines whether the remote operation can be performed.

As shown in the figure, in the vehicle remote operation process, the remote operation function of the vehicle 1 is first activated (S100). The remote operation function of the vehicle 1 is always stopped in order to avoid an unnecessary power consumption or an unintentional remote operation. Therefore, in the case of performing the remote operation, first, an activation signal of the remote operation function is transmitted from the mobile terminal 100 to the vehicle 1.

Next, it is determined whether the response signal from the vehicle 1 has been received (S101). Upon receiving the activation signal of the remote operation function, the vehicle 1 activates the remote operation function and transmits a response signal to the mobile terminal 100. When the response signal has not been received (NO in S101), it is considered that the activation signal of the remote operation function has not reached the vehicle 1, and therefore, the process returns to S100, and the activation signal of the remote operation function is transmitted again to the vehicle 1.

When the response signal from the vehicle 1 has been received (YES in S101) while repeating the start operation (S100) and the determination (S101), an instruction to prompt the user 2 of the vehicle 1 to capture an image of the vehicle 1 is displayed on the operation screen (S102). As described above, in the present embodiment, the determination as to whether the vehicle is an operation target, the determination as to whether the distance is appropriate for the remote operation, and the like are performed based on the captured vehicle image. For that reason, at the start of the remote operation, there is a need to capture the image of the vehicle 1 with the mobile terminal 100, and therefore, the user 2 of the vehicle 1 directs the camera of the imaging section 101 to the vehicle 1 according to the instruction to start the image capturing. At the time of image capturing, the imaging section 101 may be activated automatically when it is determined that the response signal has been received (S101), or may be activated by the user 2 of the vehicle 1 operating an image capturing start button provided on the operation screen.

Next, the captured image is acquired by the image acquisition section 102 (S103). This processing is executed, for example, immediately after displaying an instruction to capture the image on the operation screen, or is executed by the user 2 of the vehicle 1 operating the image capturing start button displayed on the screen. Upon acquiring the captured image from the imaging section 101, the image acquisition section 102 sequentially outputs the captured image to the proper vehicle determination section 105.

Next, in the proper vehicle determination section 105, a vehicle extracting process is executed from the received captured image (S104), and it is determined whether the vehicle is present in the captured image (S105). As described above, since the remote operation is permitted when the image of the vehicle 1 is captured by the mobile terminal 100, it is first determined whether the image of the vehicle is captured. If the user 2 of the vehicle 1 has not yet started to capture the image of the vehicle 1 and the vehicle is not present in the captured image, the vehicle is not extracted and the determination is negative (NO in S105), so that the process returns to S102 and an instruction to prompt the image capturing is displayed again on the operation screen. In that case, the user 2 of the vehicle 1 performs the image capturing operation again, or starts image capturing by directing the camera to the vehicle 1. Whether the image of the vehicle is captured is determined based on whether the image of the entire vehicle is captured, for example, as described above, but a state in which a part of the vehicle image is not captured can also be determined to be permitted. At that time, as described above, the proper vehicle determination section 105 determines whether the vehicle is a proper vehicle based on the license plate identifier of the vehicle. For that reason, the determination (S105) as to whether the vehicle is present is affirmative when the vehicle is present with the license plate clearly visible. For that reason, if the license plate is not clearly visible even if the vehicle is visible, a negative determination is made, and the process returns to S102.

If the vehicle is successfully extracted from the captured image while the above processes are repeated (YES in S105), the determination is affirmative, so that the vehicle identification information is extracted from the image by analyzing the image of the vehicle in the captured image (S106). At that time, since the periphery of the captured image is captured in addition to the vehicle 1, the vehicle image is first extracted from the captured image at the time of this image analysis. Then, for example, the identifier of the license plate, the shapes and colors of the vehicle are extracted, and the extracted information is collated with information stored in the vehicle identification information storage section 106, to thereby determine whether the vehicle in the captured image is a proper vehicle, that is, whether the captured vehicle is the vehicle 1 to be remotely operated (S107).

When the information stored in advance does not match the identifier of the license plate acquired from the image, or the shapes and colors of the vehicle do not match each other, it is determined that the vehicle is not a proper vehicle to be remotely operated by the mobile terminal 100 (NO in S107), for example, a notification indicating that the vehicle is not a proper vehicle such as "the vehicle is not a vehicle that can be operated by this terminal" is output and displayed on the operation screen (S111), the remote operation function of the vehicle is ended, and the remote operation application of the mobile terminal 100 is ended. In other words, a series of processing ends without executing the remote operation. Upon checking the display, the user 2 of the vehicle 1 can understand that the captured vehicle has attempted to operate a vehicle which is different from the vehicle intended to be operated, or to operate a vehicle which is not his vehicle in error. Since it is determined whether the activation of the remote operation is appropriate in this manner, a vehicle other than the vehicle registered in advance in the mobile terminal 100 can be prevented from being erroneously remotely operated.

On the other hand, when the information stored in advance matches the identifier of the license plate acquired from the image, or the shapes and colors of the vehicle match each other instead of or in addition to the license plate, it is determined that the vehicle is a vehicle to be operated by the mobile terminal 100, that is, the proper vehicle (YES in S107), and the distance information acquisition section 107 analyzes the image of the vehicle and detects the distance information (S108). In this analysis, the image of the vehicle used for the determination as to whether the vehicle is a proper vehicle or not is used as it is. The detection result is displayed by, for example, updating the position of the black triangle mark on the operation screen, or is displayed by characters such as "operable range" and "outside operable range".

When it is determined from the acquired distance information that the distance from the mobile terminal 100 to the vehicle 1 exceeds the allowable distance (NO in S109), an instruction to approach the vehicle is displayed on the operation screen (S110), and the process returns to S102. Then, an image capturing instruction of the vehicle is displayed for the user 2 of the vehicle 1 (S102), and the subsequent steps (S102 to S109) are repeated. Whether the vehicle is a proper vehicle and whether the distance to the vehicle is equal to or less than the allowable distance are determined by the same vehicle image, and therefore, when the user 2 of the vehicle 1 comes close to the vehicle and the image capturing is performed again, the determination of whether the vehicle is a proper vehicle is also performed again.

Figure 6:
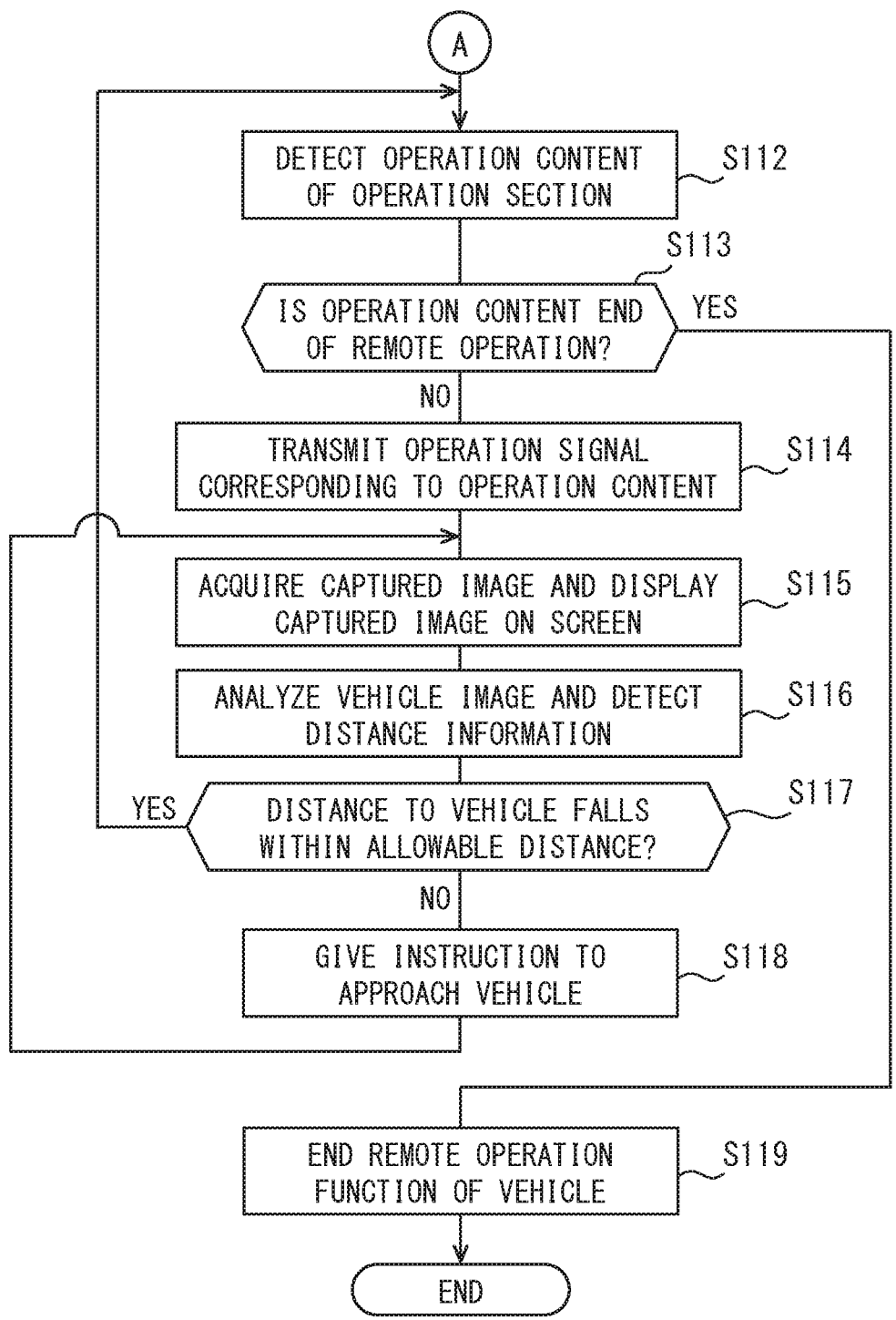
FIG. 6 is a flowchart of an operation execution stage of the vehicle remote operation process.

When it is determined that the distance to the vehicle 1 is less than or equal to the allowable distance (YES in S109) while the image capturing, extraction, and determination steps (S102 to S109) are repeated in this manner, the process proceeds to a flow shown in FIG. 6 to execute the remote operation because the condition for allowing the remote operation of the vehicle 1 is satisfied. At that time, the operation screen displays, for example, a message indicating that the remote operation is enabled or prompting the user 2 of the vehicle 1 to start the operation for the user 2 of the vehicle 1, and the user 2 operates icons, buttons, or the like displayed on the operation screen, or operates the operation buttons 120a to 120d to start the remote operation.

FIG. 6 shows a flow subsequent to FIG. 5, that is, an execution flow of the remote operation after the remote operation has been permitted. When the remote operation is permitted, the user 2 of the vehicle 1 determines a traveling direction and a turning direction for moving the vehicle 1 from the current position toward the parking spot 3, and operates the operation section 112 in accordance with the content to be operated. In other words, the user 2 of the vehicle 1 operates the icons, the buttons, or the like on the operation screen, or operates the operation buttons 120a to 120d. As a result, the operation content is detected by the operation content detection section 111 (S112).

Then, the detected operation content is determined (S113). When the operation content is not the end of the remote operation (NO in S113), since the operation intended to move the vehicle 1 is performed, the operation content detection section 111 generates an operation signal according to the operation content and outputs the operation signal to the operation signal transmission section 110, and transmits an operation signal corresponding to the operation content detected from the operation signal transmission section 110 to the vehicle 1 (S114). For example, when the operation button 120a is pressed, a left steering operation signal is transmitted to the vehicle 1, and wheels are steered to the left in a stationary manner. When the operation buttons 120a and 120b are pressed together, the operation signals of left steering and forward moving are transmitted to the vehicle 1 at the same time, and the vehicle 1 is turned to the left while moving forward. When the operation button 120c is pressed, a rearward operation signal is transmitted to the vehicle 1, and the vehicle 1 is moved rearward. When the automatic parking button 123 is tapped, the vehicle 1 is moved straight rearward toward the parking spot 3. With respect to operations other than those illustrated, similarly to those operations, an operation signal corresponding to the pressed operation button 120 or the like is transmitted, and the vehicle 1 is moved or the like.

As described above, when the operation signal is transmitted and the vehicle 1 moves, a distance to the mobile terminal 100 changes, and therefore, it is confirmed that the distance is maintained at the allowable distance for the remote operation. This confirmation processing is a procedure necessary for ensuring safety, and is performed, for example, by analyzing a captured image and detecting distance information in the same manner as when the remote operation is started. In other words, after the operation signal has been transmitted, the image acquisition section 102 acquires the image captured by the imaging section 101 at that time again (S115), extracts the image of the vehicle from the captured image, and further analyzes the image of the vehicle to detect the distance information (S116). The detection result is displayed by, for example, updating the position of the black triangle mark on the operation screen, or is displayed by a character such as "within the operable range". Next, it is determined whether the distance to the vehicle 1 is equal to or less than the allowable distance from the detected distance information (S117). If the distance is less than the allowable distance (YES in S117), the process returns to S112, the content of the operation on the operation section 112 is detected again, and the following steps are repeated. However, when it is determined that the current distance is not within the allowable distance (no in S117), for example, because the vehicle 1 is moved away from the user 2, an instruction to approach the vehicle is displayed on the operation screen (S118), and then, the process proceeds to acquire the captured image (S115) again, and the following steps are repeated.

As described above, the steps from S112 to S118 are repeated, whereby the remote operation is performed while maintaining the distance from the mobile terminal 100 to the vehicle 1 to be equal to or less than the allowable distance, based on the captured images sequentially captured and acquired. For that reason, the remote operation can be performed safely while confirming the surrounding condition of the vehicle 1.

When the image of the vehicle is analyzed (S116) after transmission of one operation signal (S114), if there is no vehicle in the image, this fact is displayed on the display device 104, and for example, the remote operation is automatically ended, or the process returns to "instruct the operator to capture the image of the vehicle" (S102 in FIG. 5), and it is determined whether the vehicle is a proper vehicle again. When the remote operation is automatically ended, the user 2 of the vehicle 1 executes the start process of the remote operation again if necessary.

When it is determined that the operation content is the end instruction of the remote operation in the process of repeating the above steps (YES in S113), the end instruction signal of the remote operation function is transmitted from the operation signal transmission section 110 to the vehicle 1 (S119). For example, when the user 2 of the vehicle 1 can move the vehicle 1 to the intended parking position, the user 2 performs an operation such as tapping the operation end button 124 provided on the operation screen. As a result, the end of the remote operation is detected by the operation content detection section 111, and the above-described process is executed. The vehicle 1 that has received the end instruction signal ends the remote operation function. After issuing an instruction to end the remote operation function to the vehicle 1, the mobile terminal 100 ends the remote operation application. For example, a response signal of the end instruction may be returned from the vehicle 1 to the mobile terminal 100, and the mobile terminal 100 may end the remote operation application after confirming the response signal.

Although each of the above steps has been described in the case where the vehicle 1 is parked by the remote operation, even when the vehicle 1 is moved out of the parking position, the same remote operation can be performed without any difference from the case where the vehicle is parked except that the moving direction and the like of the vehicle are different.

As described above, the mobile terminal 100 according to the present embodiment acquires the distance information on the distance to the vehicle 1 based on the captured image, and when the distance from the mobile terminal 100 to the vehicle 1 is within the allowable distance, the remote operation is allowed and the operation signal is transmitted from the mobile terminal 100 to the vehicle 1. For that reason, if the user 2 of the vehicle 1 is carrying the mobile terminal 100, it can be determined whether the user 2 is in the vicinity of the vehicle 1, and therefore, even if the user 2 is not carrying the electronic key, if the user 2 is present around the vehicle 1, the vehicle 1 can be moved by remote operation with the use of the mobile terminal 100.

The mobile terminal 100 according to the present embodiment includes the display device 104 for displaying the captured image, and includes the operation button 120 which is located below the display device 104 and configures the operation section 112 on the same surface. The operation contents are detected in the operation content detection section 111 and the operation signal is transmitted from the operation signal transmission section 110 to the vehicle 1. For that reason, since the remote operation can be performed while visually confirming the vehicle 1 to be operated by the display device 104, the operation can be performed more safely.

In addition, the mobile terminal 100 according to the present embodiment stores, in the vehicle identification information storage section 106, the identifier in the license plate for identifying the vehicle 1 to be operated, extracts the vehicle identification information from the vehicle image in the captured image, determines whether the vehicle is a proper vehicle that can be operated by the proper vehicle determination section 105, and when the distance from the mobile terminal 100 to the vehicle 1 is within the allowable distance and the vehicle is determined to be a proper vehicle, the remote operation signal is transmitted to the vehicle 1. This makes it possible to prevent the remote operation of the vehicle 1 from being performed without erroneously capturing the image of the vehicle to be operated and determining that the distance to the vehicle is within the allowable distance based on the captured image, and determining whether the distance to the target vehicle 1 is appropriate. Since the mobile terminal 100 can be operated only by the vehicle 1 authenticated with the vehicle, the other vehicles are not remotely operated. In addition, since the user 2 of the vehicle 1 can perform the remote operation while confirming the target vehicle 1 through the display of the display device 104 and directly by eyes, the user 2 can promptly notice another vehicle displayed on the display device 104 and change the image capturing target. Therefore, although the safety of the remote operation is sufficiently ensured even if the determination as to whether the vehicle is a proper vehicle is not performed, if the determination is performed in advance, higher safety can be obtained.

Figure 7:
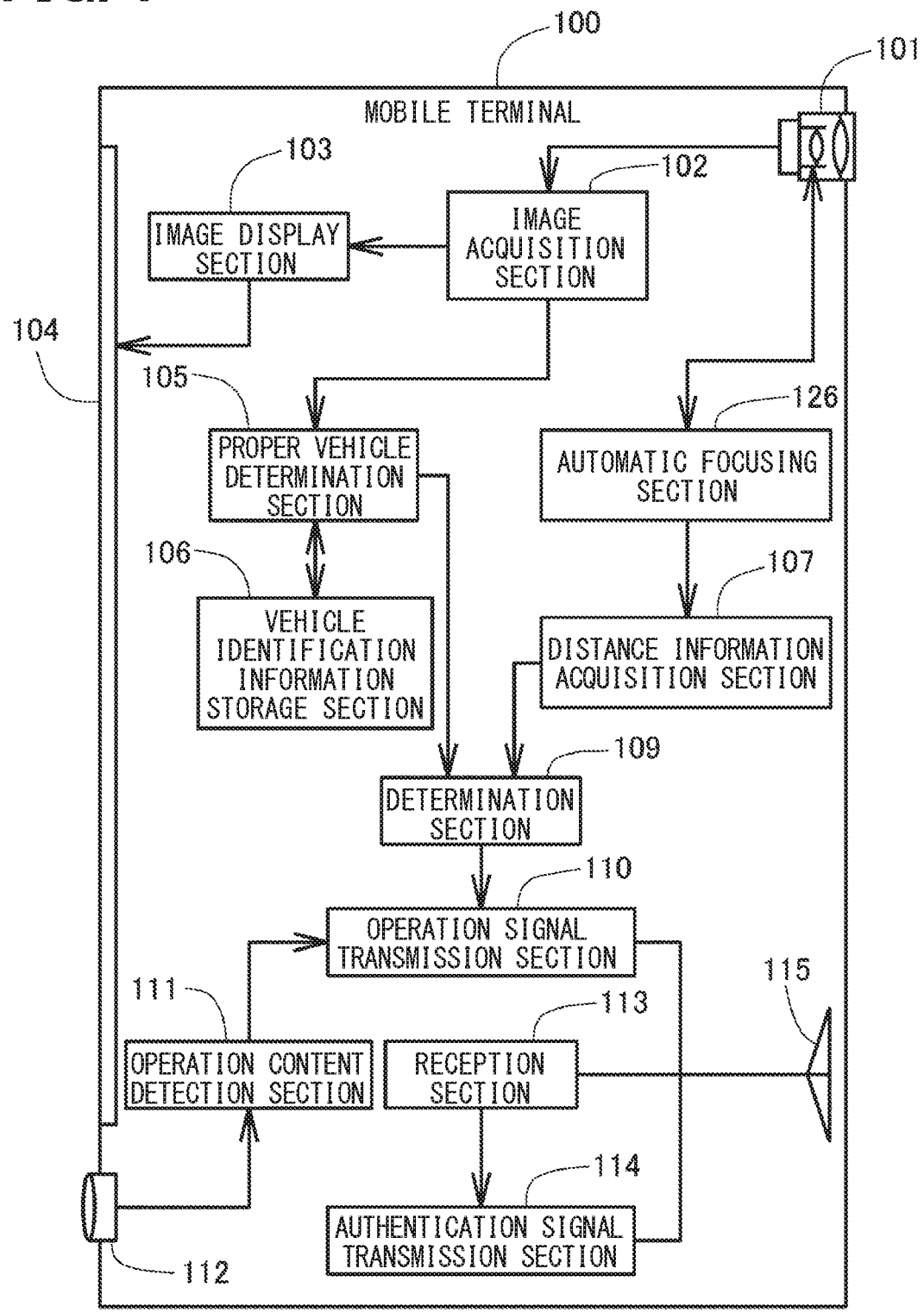
FIG. 7 is a diagram illustrating a rough internal structure of a mobile terminal according to another embodiment.

FIG. 7 is a diagram illustrating another example of the internal structure of the mobile terminal 100, and corresponds to FIG. 2. Sections common to those in FIG. 2 are denoted by the same reference numerals, and a description of the common parts will be omitted.

In the present embodiment, an automatic focusing section 126 is provided, and the imaging section 101 is provided with a lens drive mechanism for changing a focal length. The automatic focusing section 126 is provided with an automatic focusing function of a well-known passive method such as a phase difference method, an image plane phase difference method, or a contrast method, and acquires an image from the imaging section 101, analyzes the captured image to calculate a focal length adjustment amount, and outputs a focal position change signal to the imaging section 101. The lens drive mechanism is operated so that the imaging section 101 changes a focal position by extending or retracting a lens in accordance with a focal position change signal, and focuses the lens on the vehicle 1.

When focusing on the vehicle 1 in this manner, the automatic focusing section 126 detects the actual lens extending amount in the imaging section 101, and outputs an extending amount signal to the distance information acquisition section 107. Alternatively, instead of the extending amount signal, the focal position change signal output from the automatic focusing section 126 to the imaging section 101 at the time of focusing may be output to the distance information acquisition section 107. The distance information acquisition section 107 calculates the focal length at the time of focusing, that is, the distance from the mobile terminal 100 to the vehicle 1 based on the received extending amount signal or focal position change signal, and outputs the distance information signal to the determination section 109. Similar to the case shown in FIG. 2, the determination section 109 determines whether the vehicle is within the allowable distance together with the determination of whether the vehicle is a proper vehicle. In the present embodiment, the method of acquiring the distance information is different from that in the embodiment described above, and there is no need to input the vehicle dimension information to the vehicle dimension information storage section 108 in advance.

Figure 8:
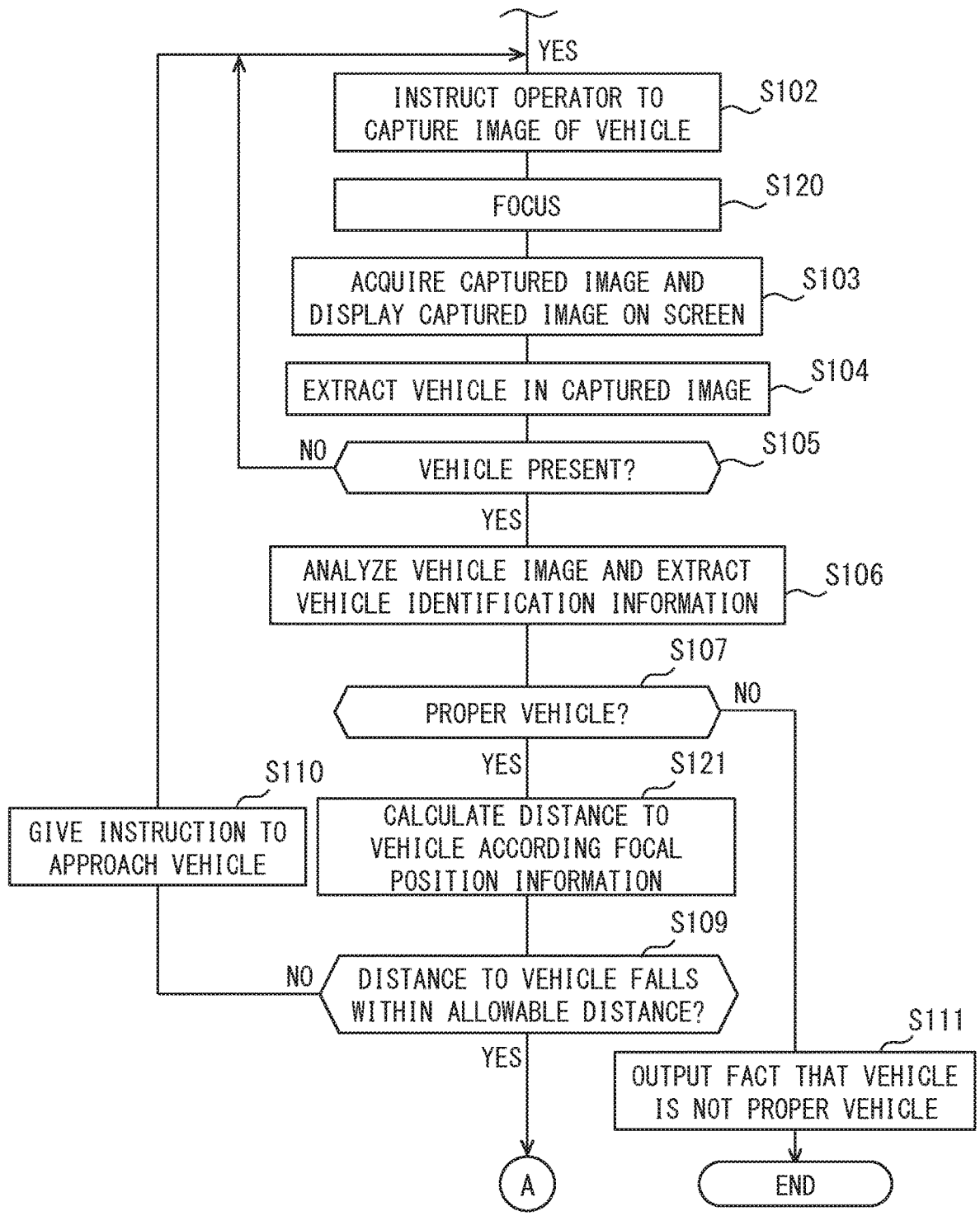
FIG. 8 is a flowchart of a start propriety determination stage in the case of the internal structure shown in FIG. 7.

FIG. 8 is a diagram showing a processing flow corresponding to the internal structure. The processing flow corresponds to FIG. 5, and a portion different from FIG. 5 will be mainly described. When image capturing of the vehicle is instructed to the user 2 of the vehicle 1 (S102), when the imaging section 101 of the mobile terminal 100 is directed to the vehicle 1 and image capturing is started, the automatic focusing section 126 processes the image data sequentially sent from the imaging section 101, changes the focal position of the image data, and causes the imaging section to focus on the vehicle 1 (S120). Next, the image acquisition section 102 acquires a captured image (S103), and executes the step of extracting the vehicle in the captured image (S104) and the subsequent steps.

Then, when it is determined based on the analysis result of the vehicle image that the vehicle is a proper vehicle (YES in S107), the distance information acquisition section 107 acquires the distance information from the mobile terminal 100 to the vehicle 1 based on a lens extending amount signal or a focal position change signal sent from the automatic focusing section 126, that is, the focal position information when the captured image serving as a source of the vehicle image is acquired (S121). As described above, in the above processing flow, the vehicle image is not used for the detection of the distance information, and the distance information acquired based on the focal position information output by the automatic focusing section 126 at the time of focusing is used.

Also, in the case of the present embodiment, the remote operation process is executed in accordance with the same flow as that shown in FIG. 6. At that time, instead of detecting the distance information (S116), the distance from the mobile terminal 100 to the vehicle 1 is acquired based on the information obtained from the automatic focusing section 126, in the same manner as the "calculation of the distance from the focal length information to the vehicle" (S121) shown in FIG. 8.

Figure 9:
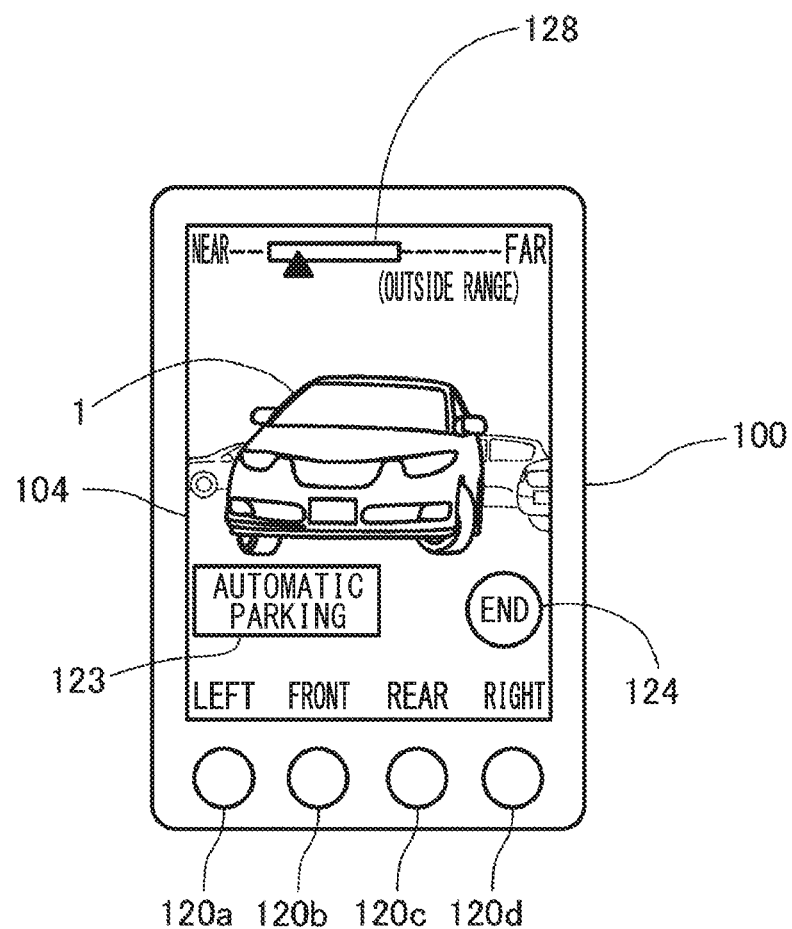
FIG. 9 is a diagram illustrating a screen display example according to still another embodiment.

FIG. 9 shows a display example of another embodiment of the mobile terminal 100. In this display example, a distance display section 128 is provided in place of the distance display section 122 at an upper portion of an operation screen. In the distance display section 128, a dashed line is displayed between a wide allowable distance bar and "near" on the left side of the wide allowable distance bar. The dashed line represents the outside of an allowable range of a remote operation as in the case of the "far" side, and in this example, the remote operation is prohibited when a distance between the mobile terminal 100 and the vehicle 1 becomes equal to or smaller than a predetermined distance.

For example, if the user 2 comes in too close to the vehicle 1, the user 2 may come into contact with the vehicle 1 when an operation direction is in error. For that reason, in the present embodiment, a lower limit value is also determined in addition to an upper limit value of the allowable distance, and the determination of whether the distance to the vehicle is within the allowable distance in the determination section 109, that is, in the processing flow, the determination of "whether the distance to the vehicle is within the allowable distance" (S109 and S117) is determined to be within the allowable distance when the distance to the vehicle is within the upper and lower limits.

A flowchart or a process of the flowchart described in the present disclosure includes multiple sections (or steps), and each section is expressed, for example, as S100. Furthermore, each section may be divided into multiple subsections, while the multiple sections may be combined into one section. In addition, each section configured in this manner may be referred to as a circuit, a device, a module, or a means.

Also, each or a combination of the multiple sections may be implemented as (i) a section of software in combination with a hardware section (for example, a computer), as well as (ii) a section of hardware (for example, an integrated circuit, a wired logic circuit), with or without the functionality of the associated device. Further, the hardware section can be configured inside a microcomputer.

Although the present disclosure has been described in accordance with the embodiments, it is understood that the present disclosure is not limited to such embodiments or structures. The present disclosure encompasses various modifications and variations within the scope of equivalents. In addition, various combinations and forms, as well as other combinations and forms including only one element, more than that, or less, among them, fall within the scope and concept of the present disclosure.

What is claimed is:

1. A mobile terminal to be carried by a user of a vehicle and capable of moving the vehicle by remote operation by transmitting an operation signal corresponding to operation by the user to the vehicle, the mobile terminal comprising:
a processor configured to:
capture an image of the vehicle and acquire the captured image;
display the captured image;
detect the vehicle in the captured image and acquire distance information on a distance to the vehicle based on the captured image;
determine whether the distance to the vehicle is within an allowable distance, which is predetermined, based on the distance information;
check a display of the captured image by the user and detect an operation content; and
transmit the operation signal corresponding to the operation content to the vehicle when the distance to the vehicle is determined to be within the allowable distance, wherein
even after the processor has transmitted the operation signal to the vehicle, when the vehicle is no longer detected in the captured image or when the distance to the vehicle is determined to be outside the allowable distance, the processor stops transmitting the operation signal corresponding to the operation content until the distance to the vehicle is determined to be within the allowable distance.

2. The mobile terminal according to claim 1, wherein the processor displays, in addition to the captured image, the distance information on the vehicle detected in the captured image and information on whether the distance information is within the allowable distance.

3. The mobile terminal according to claim 1, wherein the processor acquires the distance information based on a size of the vehicle in the captured image.

4. The mobile terminal according to claim 1, wherein
the processor is configured to focus on the vehicle by analyzing the captured image and changing a focal position, and
acquire the distance information based on information of the focal position.

5. The mobile terminal according to claim 1, wherein:
the processor is configured to store vehicle identification information for identifying a proper vehicle to be remotely operated by the user; and
determine whether the vehicle is the proper vehicle by extracting the vehicle identification information from the image of the vehicle in the captured image, wherein
the processor transmits the operation signal when the distance to the vehicle is determined to be within the allowable distance and the vehicle is determined to be the proper vehicle.

6. The mobile terminal according to claim 3, wherein:
the processor is configured to store vehicle dimension information on a vehicle dimension of a proper vehicle to be remotely operated by the user, wherein the processor acquires the distance information based on the size of the vehicle in the captured image and the vehicle dimension information.

7. The mobile terminal according to claim 1, wherein:
the processor is configured to receive a predetermined authentication request signal transmitted from the vehicle; and
transmit a predetermined authentication signal stored in advance upon receiving the authentication request signal.

8. The mobile terminal according to claim 1, wherein
even after the processor has transmitted the operation signal to the vehicle, when the vehicle is no longer detected in the captured image, the processor stops transmitting the operation signal corresponding to the operation content until the distance to the vehicle is determined to be within the allowable distance.

9. A remote operation method for moving a vehicle by a remote operation using a mobile terminal carried by a user of the vehicle, the remote operation method comprising:
acquiring a captured image of the vehicle from an imaging section mounted on the mobile terminal and displaying the captured image;
detecting the vehicle in the captured image and acquiring distance information on a distance to the vehicle;
determining whether a distance to the vehicle is within a predetermined allowable distance based on the distance information;
detecting an operation content input to an operation section provided to be operable by the user while checking a display of the captured image; and
transmitting an operation signal corresponding to the operation content to the vehicle when the distance to the vehicle is determined to be within the allowable distance, wherein
even after having transmitting the operation signal to the vehicle, when the vehicle is no longer detected in the captured image or when the distance to the vehicle is determined to be outside the allowable distance, the transmission of the operation signal corresponding to the operation content is stopped until the distance to the vehicle is determined to be within the allowable distance.

10. The remote operation method according to claim 9, wherein
even after having transmitting the operation signal to the vehicle, when the vehicle is no longer detected in the captured image, the transmission of the operation signal corresponding to the operation content is stopped until the distance to the vehicle is determined to be within the allowable distance.

11. A mobile terminal to be carried by a user of a vehicle, comprising:
a camera configured to capture an image of the vehicle;
a display panel;
an antenna;
an operation button provided to be operable by the user to remotely control the vehicle;
a processor connected to the camera, the display panel, the antenna, and the operation button; and
a memory storing a program that instructs the processor to
acquire a captured image from the camera and display the captured image on the display panel,
detect the vehicle in the captured image and acquire distance information on a distance to the vehicle based on the captured image, determine whether the distance to the vehicle is within an allowable distance, which is predetermined, based on the distance information, detect an operation content input by the user with the operation button, and transmit the operation signal corresponding to the operation content from the antenna to the vehicle when the distance to the vehicle is determined to be within the allowable distance, wherein even after transmitting the operation signal to the vehicle, when the vehicle is no longer detected in the captured image or when the distance to the vehicle is determined to be outside the allowable distance, the program instructs the processor to stop transmitting the operation signal corresponding to the operation content until the distance to the vehicle is determined to be within the allowable distance.

12. The mobile terminal according to claim 11, wherein even after having transmitting the operation signal to the vehicle, when the vehicle is no longer detected in the captured image, the program instructs the processor to stop transmitting the operation signal corresponding to the operation content until the distance to the vehicle is determined to be within the allowable distance.

* * * * *